US011423628B2

(12) United States Patent
Sanderson et al.

(10) Patent No.: US 11,423,628 B2
(45) Date of Patent: Aug. 23, 2022

(54) SYSTEM AND METHOD FOR CONVERTING A TWO-DIMENSIONAL FLOOR PLAN INTO AN INTERACTABLE THREE-DIMENSIONAL SIMULATION

(71) Applicant: CONCEPT SAFETY SYSTEMS (HOLDINGS) PTY LTD., Brisbane (AU)

(72) Inventors: Simon Sanderson, Brisbane (AU); Andrew Eross, Brisbane (AU)

(73) Assignee: CONCEPT SAFETY SYSTEMS (HOLDINGS) PTY LTD., Queensland (AU)

( * ) Notice: Subject to any disclaimer, the term of this patent is extended or adjusted under 35 U.S.C. 154(b) by 0 days.

(21) Appl. No.: 17/428,970

(22) PCT Filed: Feb. 6, 2020

(86) PCT No.: PCT/AU2020/050098
§ 371 (c)(1),
(2) Date: Aug. 5, 2021

(87) PCT Pub. No.: WO2020/160623
PCT Pub. Date: Aug. 13, 2020

(65) Prior Publication Data
US 2022/0044484 A1    Feb. 10, 2022

(30) Foreign Application Priority Data

Feb. 6, 2019   (AU) ................................ 2019900374

(51) Int. Cl.
*G06T 19/00*   (2011.01)
*G06V 20/10*   (2022.01)
*G06F 3/01*    (2006.01)

(52) U.S. Cl.
CPC ............ *G06T 19/006* (2013.01); *G06F 3/011* (2013.01); *G06T 19/003* (2013.01); *G06V 20/10* (2022.01); *G06T 2200/08* (2013.01)

(58) Field of Classification Search
None
See application file for complete search history.

(56) References Cited

U.S. PATENT DOCUMENTS 10,137,984 B1   11/2018  Flick
2008/0243305 A1  10/2008  Lee et al.
(Continued)

OTHER PUBLICATIONS

Petro et al., "Airflow Modeling and Fire Smoke Propagation in the New Ecole Polytechnique Building", Building simulation, 2005. (Year: 2005).*

*Primary Examiner* — Nicholas R Wilson
(74) *Attorney, Agent, or Firm* — Rodney J. Fuller; Booth Udall Fuller, PLC

(57) ABSTRACT

A system and method for indoor spatial mapping. The system includes a mobile mapping device having a camera; a plan database configured to store 2-D floor plans; and a processor configured to integrate a selected floor plan from the plan database with object data received from the mobile mapping device to create an interactable 3-D spatial mapping of an interior portion of a structure so that one or more objects are moveable relative to a surrounding environment within the 3-D spatial mapping. The processor is configured to recognise objects from an image from the camera and anchor the recognised object within the interactable 3-D spatial mapping.

20 Claims, 5 Drawing Sheets

(56) References Cited

U.S. PATENT DOCUMENTS

| | | |
|---|---|---|
| 2012/0214515 A1 | 8/2012 | Davis et al. |
| 2016/0140257 A1 | 5/2016 | Vega |
| 2019/0050137 A1* | 2/2019 | Mildrew ............. G06F 3/04815 |
| 2020/0050206 A1* | 2/2020 | Deyle ..................... G01S 13/74 |
| 2020/0117336 A1* | 4/2020 | Mani ..................... F25B 49/005 |

* cited by examiner

SYSTEM AND METHOD FOR CONVERTING A TWO-DIMENSIONAL FLOOR PLAN INTO AN INTERACTABLE THREE-DIMENSIONAL SIMULATION

CROSS-REFERENCE TO RELATED APPLICATIONS

This application is the U.S. National Stage of International Patent Application No. PCT/AU2020/050098, filed on Feb. 6, 2020, which claims the benefit of and priority to Australia Patent Application No. 2019900374, filed on Feb. 6, 2019, the contents of each of which are hereby incorporated by reference in their entireties.

FIELD OF THE INVENTION

The present disclosure relates to improvements in systems and methods for rendering a two-dimensional floor plan in a spatial, three-dimensional format.

BACKGROUND OF THE INVENTION

Most buildings do not have a customised or site-specific evacuation training system. For those few that have an evacuation training system, such systems rely on two-dimensional (2-D) plans as part of any training exercise. Reading and attempting to memorise details from 2-D plans is tedious, and many details are not memorised by key individuals. Moreover, 2-D plans are not conducive to use during realistic emergency situations. Accordingly, there exists a need to provide an improved system and method which is less prone to the problems of conventional systems and methods, and provides a more engaging, memorable and safe experience.

For systems which do render a 3-D plan, such systems fall short since many situations and objects that may be encountered and likely to be used are not useable within a simulation.

SUMMARY

The present invention in one preferred aspect provides for a system for indoor spatial mapping. The system includes a mobile mapping device having a camera, a plan database configured to store 2-D floor plans, and a processor configured to integrate a selected floor plan from the plan database with object data received from the mobile mapping device to create an interactable three-dimensional (3-D) spatial mapping of an interior portion of a structure so that one or more objects are moveable relative to a surrounding environment within the 3-D spatial mapping, the processor being configured to digitally recognise objects from an image from the camera and anchor the recognised object within the interactable 3-D spatial mapping. Preferably, structural features such as walls and doorways are interactable as well as objects such as hose reels, fire extinguishers and even lighting.

In another preferred aspect, the present invention provides a method for generating an indoor spatial mapping. The method includes storing a 2-D floor plan in a floor plan database; digitally tagging reference points which include at least one item of emergency equipment in a level of a structure; anchoring the at least one tagged item of emergency equipment to the 2-D floor plan; and rendering a 3-D floor plan with at least one anchored item of emergency equipment, the anchored emergency equipment being interactable within the 3-D floor plan.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers, but does not exclude the inclusion of one or more further integers. It will be appreciated that reference herein to "preferred" or "preferably" is intended as exemplary only.

As used herein, "interaction" or "interactable" is intended to refer to an object or item which is moveable within the simulated environment, compared to surrounding objects, features or items. For example, a user may interact with an item such as a fire extinguisher by picking it up or handling it, aiming a nozzle or hose, and triggering a release to expel contents towards a hazard such as a fire. It will be appreciated that both objects and positioning within the spatial mapping may be interacted with to simulate an environment and provide a more realistic situation. For example, smoky conditions may be included to obfuscate vision when traversing a passage or stairwell. A moving surrounding environment may be included to simulate an explosion, or earthquake. Simulated movement(s) or condition(s) may be derived from a database storing such data for a particular object or condition preconfigured prior to inclusion in any simulation.

As used herein, "configured" includes creating, changing, or modifying a program on a computer or network of computers so that the computer or network of computers behave according to a set of instructions. The programming to accomplish the various embodiments described herein will be apparent to a person of ordinary skill in the art after reviewing the present specification, and for simplicity, is not detailed herein. The programming may be stored on a computer readable medium, such as, but not limited to, a non-transitory computer readable storage medium (for example, hard disk, RAM, ROM, CD-ROM, USB memory stick, or other physical device), and/or the Cloud.

The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figure 1:
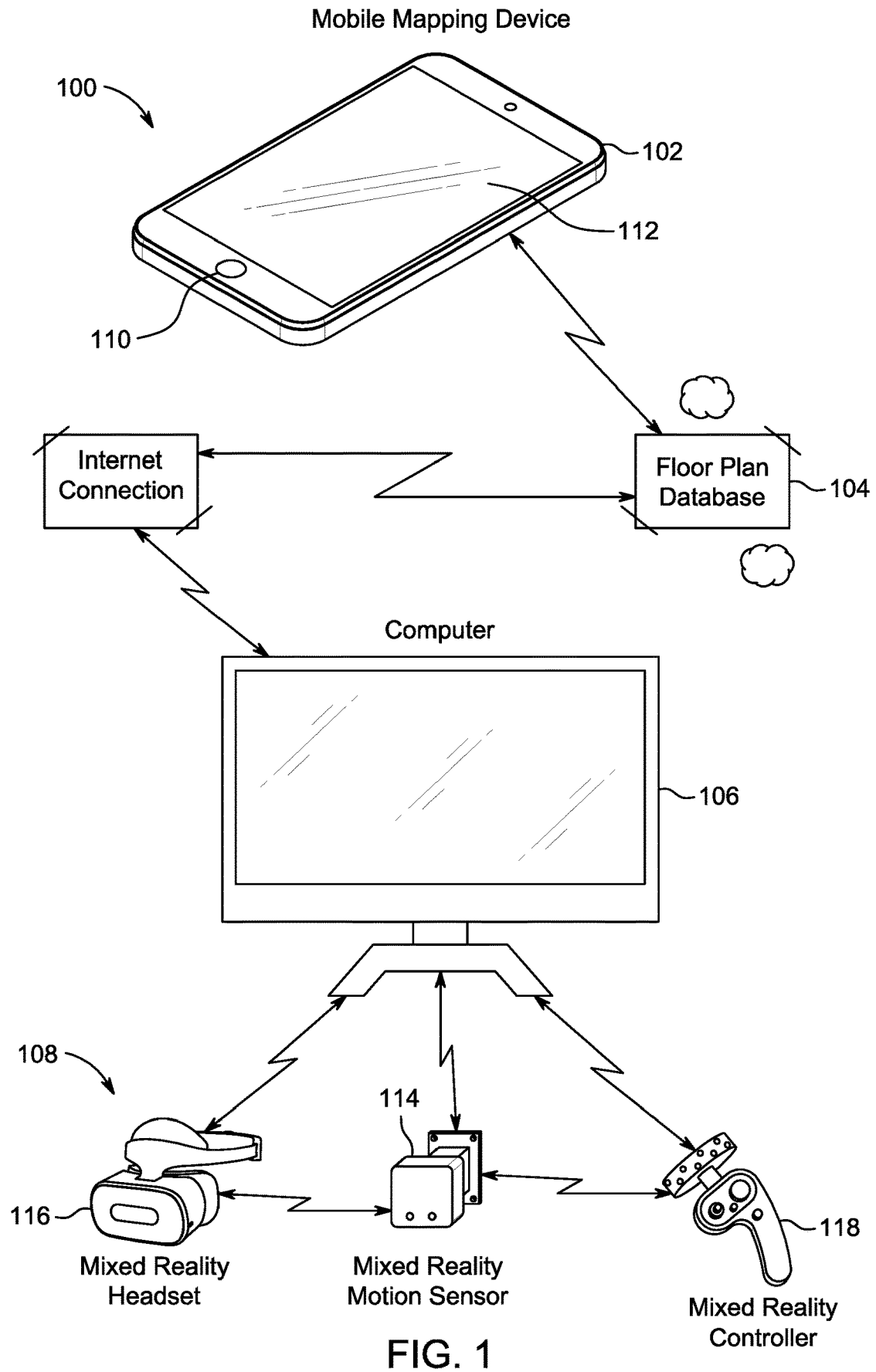
FIG. 1 is a system diagram of the components of the system in accordance with a preferred embodiment of the present invention.

FIG. 1 shows a preferred embodiment of a system 100 for indoor spatial mapping having a mobile mapping device 102, a floor plan database 104, a computer processor 106, and a mixed-reality system 108. In use, a user surveys the interior of a floor of a building with mapping device 102. Data from the survey is uploaded and stored to database 104. Objects are tagged and anchored within the floor plan using processor 106, and stored as needed in database 104 as an enhanced or latent 3-D floor plan. The latent 3-D floor plan is downloaded from database 104 to a mixed-reality system 108 to render an active, explorable indoor 3-D spatial mapping with objects previously tagged and anchored. The preferred elements of system 100 and their interrelationship are described below.

Referring to FIG. 1, mobile mapping device 102 preferably includes a user interface 110, display 112, a camera, a depth detector, and a wireless transceiver radio. The depth detector may include a depth detection laser emitter. The details of depth detection would be appreciated by a person of ordinary skill in the art, and are omitted for simplicity. The wireless radio is preferably configured for Wi-Fi and/or peer-to-peer communications, such as Bluetooth, Wi-Fi Direct, and/or NFC. It will be appreciated that mapping device 102 may be configured for wired communication in addition to, or as an alternative to wireless communication.

In one or more embodiments, mapping device 102 may be a customised, purpose-build device for indoor spatial mapping, or a specially programmed smartphone, tablet, or other mobile computing device configured as desired to perform the spatial mapping functions described in one or more exemplary embodiments herein.

Floor plan database 104 is configured to store a plurality of digitised floor plans. Database 104 may be configured as a physical server, a cloud server, a part of a distributed server network, and/or a portable memory, with or without wireless communications.

Processor 106 may be in the form of a microcomputer such as a laptop computer. Processor 106 preferably includes a microchip, such as a System on Chip (SoC), with appropriate control circuitry.

Mixed reality system 108 is configured to combine features from real-world surroundings with features from database 104. In one preferred embodiment, mixed reality system 108 is configured as a virtual reality system. Mixed reality system 108 preferably includes a motion sensor 114, a headset 116, and a controller 118. Motion sensor 114 is configured to detect the location and orientation of headset 116, and transmit data accordingly. Controller 118 is configured to permit a user to interact with items in the simulation as viewed through headset 116. Motion sensor 114 may be partially or fully integrated with headset 116. Controller 118 may be physical or virtual, as part of headset 116. The details of a virtual reality system would be well understood, and for simplicity, are not repeated herein.

Figure 2:
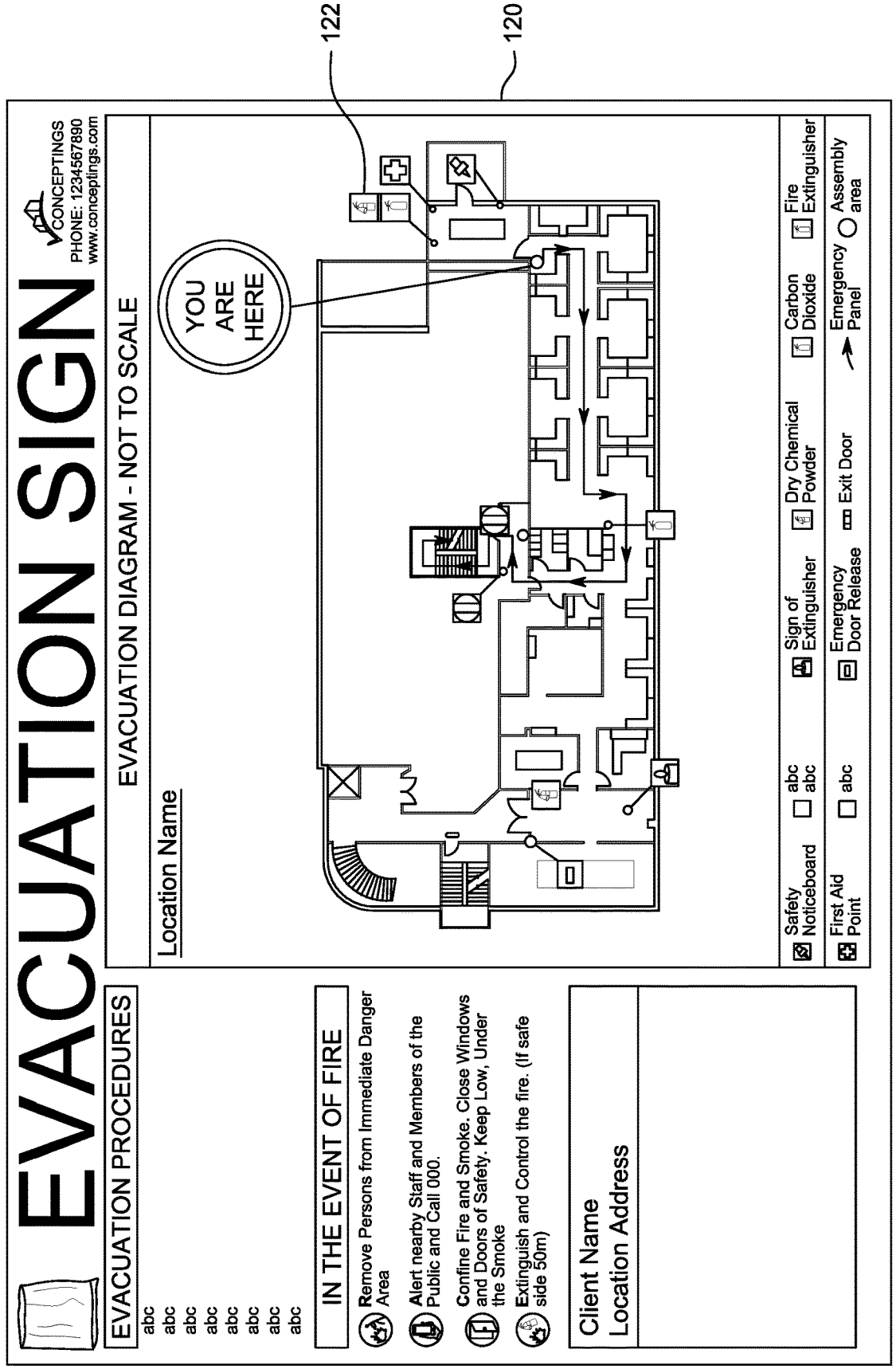
FIG. 2 is an evacuation sign useable with the system of FIG. 1.
Figure 3:
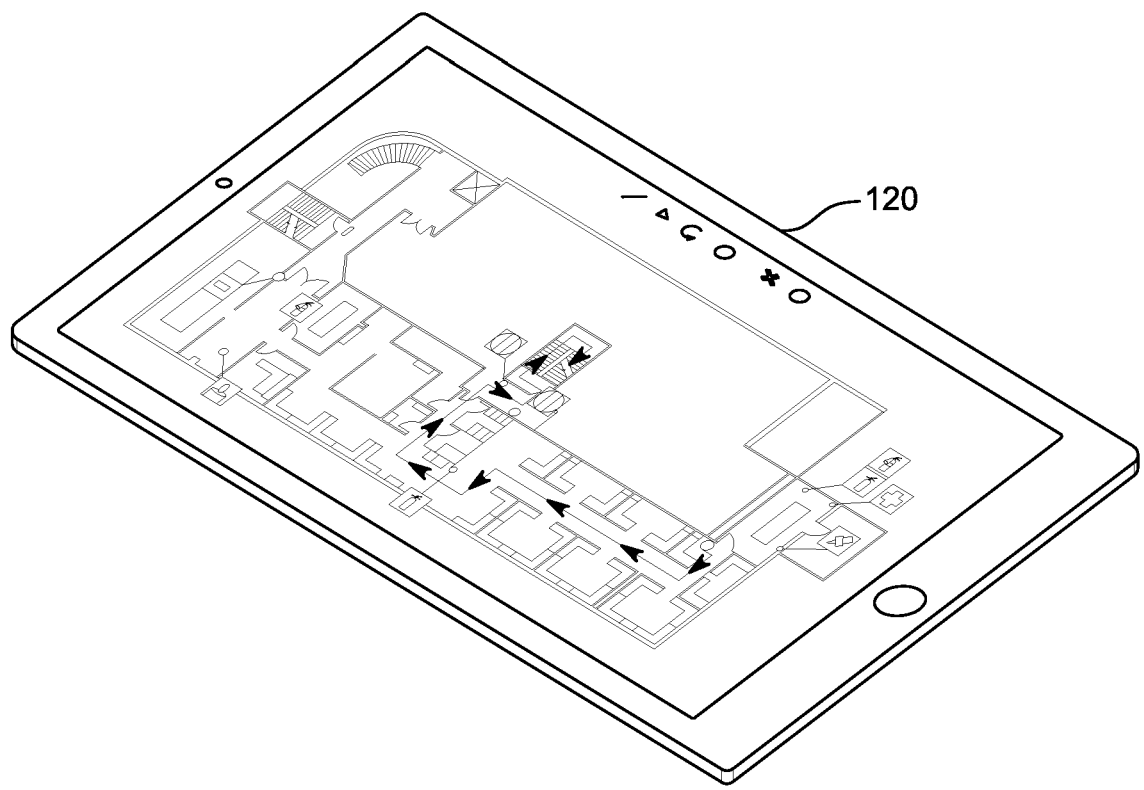
FIG. 3 is a perspective view of a floor plan useable with the system of FIG. 1.

Having described the preferred components of system 100, a preferred method of creating an indoor spatial mapping will now be described. Referring to FIGS. 1-3, an indoor spatial mapping is created by first storing a two-dimensional floor plan 120 in floor plan database 104. Two-dimensional floor plans may be derived from multiple sources. For example, only, a 2-D floor plan may be digitally scanned with mapping device 102 on site, digitally scanned from a paper copy, provided electronically from another source, or any combination thereof. Once stored in plan database 104, the floor plan is formatted for 3-D presentation according to preferred steps set forth below.

Reference points are identified and digitally tagged. A reference point may be classified in according to fixed spatial, and moveable object (relative to other reference points). A tag for a fixed spatial reference point will include coordinates along the X, Y, and Z axes. The coordinates may be determined between reference points (local coordinates based on distance and angular orientation), and/or geographical coordinates. Local coordinates may be obtained by using a depth indicator on mapping device 102, manually measuring distances on site, or through a local grid between devices such as Bluetooth beacons. Geographical coordinates may be obtained using an onboard GPS (if available), in combination with accelerometers and/or gyroscopes optionally integrated with mapping device 102 should a GPS signal not be available due to indoor interference.

A tag for a moveable object reference point may include coordinates obtained in similar fashion as those for fixed spatial reference points. The tag for a moveable object reference point will additionally include an indicator that the reference point associated with the object is moveable relative to one or more fixed spatial reference points. The tag will further preferably include an indicator that the object is interactable, and an object identifier indicating the nature of the object, for example only, furniture or emergency equipment.

Objects that are interactive may be interacted with in one or more ways, such as moving, toggling, removing, rotating, lifting or setting down. An indicator indicating interactivity may be formed as a label and/or a special colour, highlighting or shading/shadowing.

A tag may be generated based on object recognition technology. For example only, image recognition technology may be used when scanning an 3-D object with mapping device 102 if obtaining onsite data electronically. Image recognition technology may also be used when scanning a 2-D floor plan into database 104 by recognising a symbol for an object. For example, a standard fire extinguisher symbol may be recognised as a fire extinguisher by processor 106, and the tag linked to the object (fire extinguisher) may be configured so that processor 106 renders a 3-D fire extinguisher based on the symbol shown in the 2-D floor plan.

Examples of items or areas tagged with fixed spatial reference points include permanent physical references such as entry and exits, doorways, windows, and stairs and/or lifts (if multi-level). Examples of items tagged with moveable object reference points may include furniture, and emergency equipment such as a hose reel, fire blanket, and/or fire extinguisher 122. Examples of items tagged as interactive include a fire extinguisher, fire blanket, and/or hose reel. Thereafter, the interactive tagged item is anchored to the two-dimensional floor plan in an initial, starting position (it being understood that the item may be moveable within the simulation when rendered). The anchoring may be accomplished by fixing the coordinates of an object or feature within a geospatial grid. Next, the floorplan, now enhanced with digital tags, is saved in database 104 as a latent 3-D floorplan and ready for rendering as an active, explorable 3-D floorplan with appropriate viewing equipment, as set forth further below. Periodic floor surveys may be used to modify and/or update floorplan data and change tag coordinates and/or types as needed. Enhancing a digital plan with one or more tags indicating interactability may be by way of colour, shadowing, or explicitly with text and/or one or more symbols.

Figure 4:
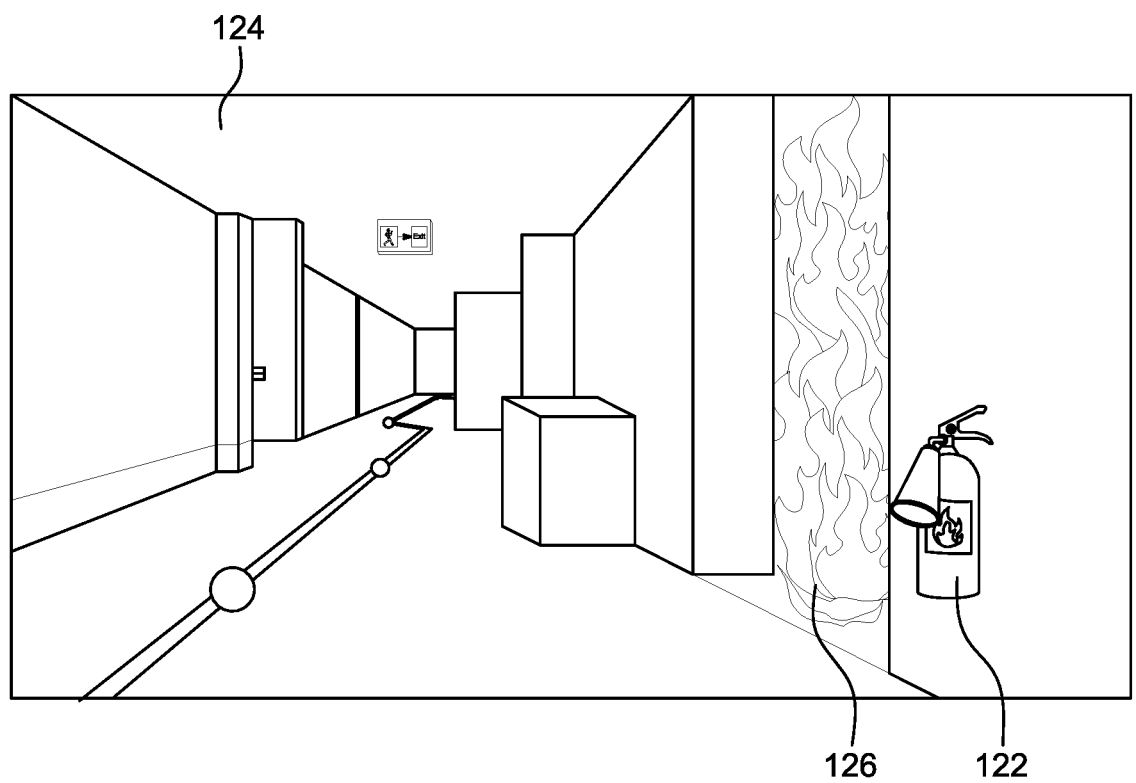
FIG. 4 is a view of a 3-D spatial mapping as seen from a mixed-reality viewing device.
Figure 5:
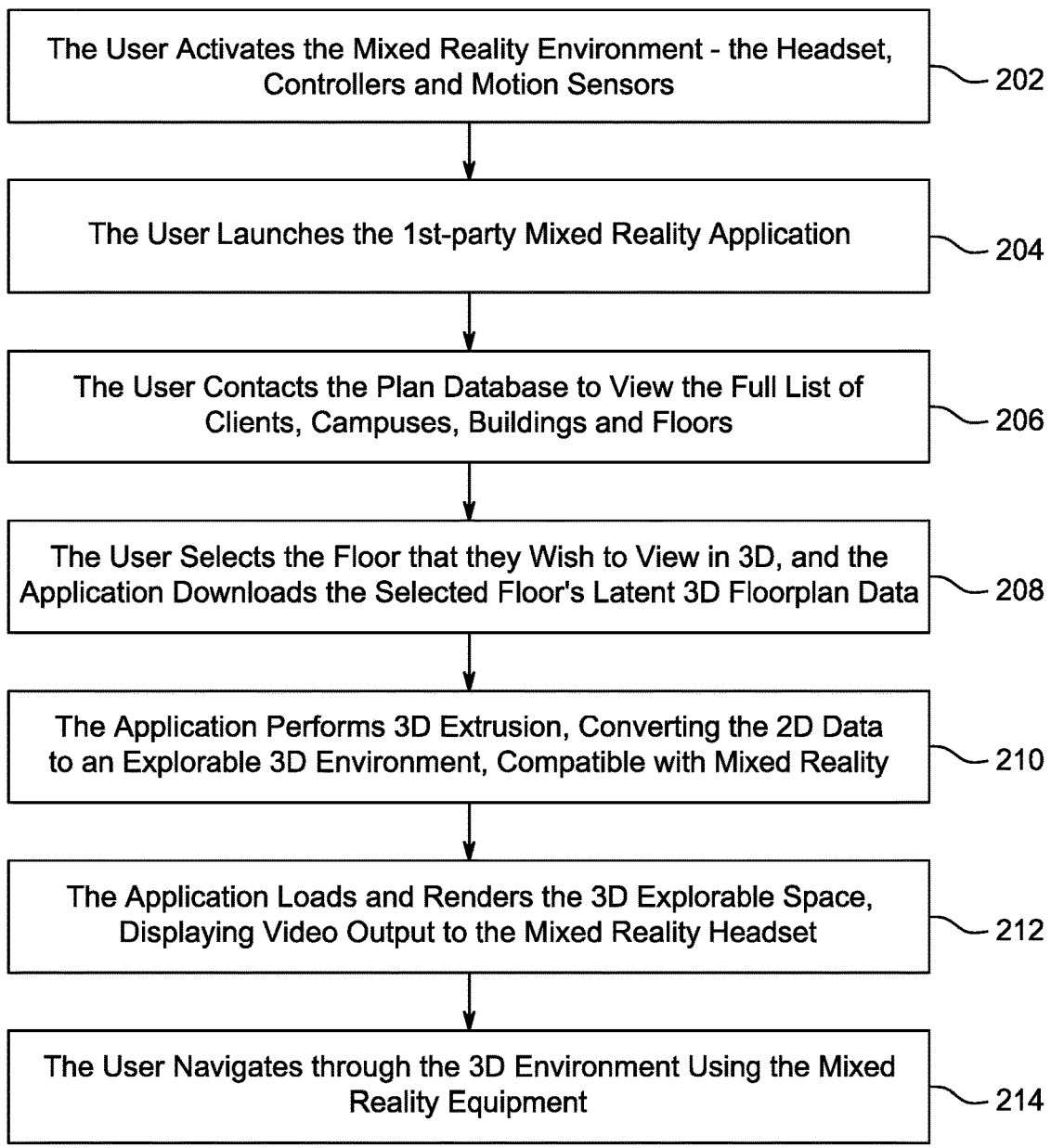
FIG. 5 is a flow diagram of a preferred method of rendering an indoor spatial mapping.

FIG. 5 shows a preferred method 200 of rendering the latent 3-D floorplan as an active, explorable 3-D spatial mapping. In step 202, the user activates the mixed reality environment or system 108 (FIG. 1), for example, sensor(s) 114, headset 116, and controller 118. Next, in step 204, the user launches 1$^{st}$ party mixed reality application, and, in step 206, connects to plan database 104 (FIG. 1). The plan database may include more than just floorplans. For example, the plan database may include a variety of profiles and data, such as a list of clients, campuses, buildings, and/or floors. In step 208, the user selects the floor that they wish to view in 3-D, and the application downloads the selected floor's latent 3-D floorplan data. Next, in step 210, the application performs a 3-D extrusion, converting the tagged 2-D data to an explorable 3-D environment, compatible with mixed reality. In step 212, the application loads and renders the 3-D explorable space 124 (FIG. 4), displaying video output to mixed reality headset 116 (FIG. 1). Thereafter, in step 214, the user navigates through the 3-D environment using the mixed reality equipment, as shown in FIG. 4. As shown in FIG. 4, within the explorable space, the user may interact with items tagged for interaction, such as fire extinguisher 122 to put out a fire 126. Other examples may include a hose reel, a building alarm, an axe, etc. The interactable plan may include multiple layers of data to accommodate fixed object movement (e.g., a door that swings) and/or environmental conditions such as smoke density.

It will be appreciated that the steps described above may be performed in a different order, varied, or one or more steps omitted entirely without departing from the scope of the present invention.

In order to help a user improve their training, the system may be configured to permit viewing by a trainer or supervisor on a monitor while the user is undergoing the 3-D simulation utilising the mixed reality system. The trainer may dynamically interact in the simulation during the training exercise by creating emergency situations (e.g., fires, etc.). At the end of the simulation, the user's performance may be assessed and scored. A machine learning algorithm may be applied to identify areas where the user could improve performance. Multiple performances by a variety of users can be used by the machine learning algorithm to indicate areas that could be improved in building safety (e.g., placement of emergency equipment, optimal size and placement of building features, etc.). Improved emergency preparedness by key personnel, coupled with improved building design after analysing evacuation patterns, will help save lives.

The foregoing description is by way of example only, and may be varied considerably without departing from the scope of the present invention. For example only, the mixed reality system may omit fixed sensors to rely solely on motion sensors embedded in the headset. A controller, when used, may be configured as a wearable item or article of clothing such as a glove and/or shoe.

As an alternative to a virtual reality system with a headset, the mixed reality system may be configured on a smartphone to run augmented reality technology.

Features of the invention may be adapted to external environments. For example, campus plans, walkways, courtyards, patios, balconies, parking lots (or car parks) and areas between buildings may be converted from a 2-D plan into a 3-D spatial mapping and simulation.

A variety of emergency scenarios may be simulated for evacuation planning. For example only, artificial disasters such as a building fire or terrorist situation, or natural disasters such an earthquake, tornado, flood or hurricane may be simulated for practicing a building evacuation.

One or more of the embodiments described above may be configured for uses other than emergency simulation. For example only, creation of an indoor spatial map may be used for planning building extensions, or installing integrated building systems such as utilities, security and/or fire alarm systems, and HVAC systems. The indoor spatial map may also be utilised as a base to optimally configure efficient use of energy (e.g., lighting, heating and air conditioning), or determine the best placement of items such as emergency equipment. In one or more embodiments, use in a gaming context (i.e., pitting players in live action against each other, particularly for entertainment) is specifically excluded.

The features described with respect to one embodiment may be applied to other embodiments, or combined with or interchanged with the features of other embodiments, as appropriate, without departing from the scope of the present invention.

The present invention in a preferred form provides the advantages of a more realistic environment and memorable simulation for building evacuations. By creating a simulation that is more memorable, key personnel, when faced with a real emergency, will act instinctively based on realistic practice rather than guessing and trying to remember details of a floorplan while under pressure to leave. Including interactable environments and objects creates a more realistic situation, and better prepares users for scenarios which may well be encountered. As has been well-researched, in an emergency situation, even saving a few seconds can save lives.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for indoor spatial mapping, comprising:
a mobile mapping device having a camera;
a plan database configured to store 2-D floor plans; and
a processor configured to integrate a selected floor plan from said plan database with object data received from said mobile mapping device to create an interactable 3-D spatial mapping of an interior portion of a structure so that one or more objects are moveable relative to a surrounding environment within the 3-D spatial mapping, the object data including geospatial coordinates of the object, said processor being configured to digitally recognize said moveable objects from an image from said camera and spatially anchor the recognized moveable object in an initial position within the interactable 3-D spatial mapping by fixing the coordinates of the object within a geospatial grid.

2. The system of claim 1, wherein the object data includes an item of emergency equipment.

3. The system of claim 2, wherein the emergency equipment includes at least one of a fire extinguisher or a hose reel.

4. The system of claim 1, wherein said mobile mapping device is configured to tag predetermined objects for anchoring within the interactable 3-D spatial mapping.

5. The system of claim 1, further comprising a virtual reality headset configured to receive a data stream from said processor to render the 3-D spatial mapping.

6. The system of claim 1, wherein said processor is configured to deliver a data stream to a mobile communications device having a camera, the data stream causing the mobile communications device to display real-time surroundings in an augmented reality manner when positioned inside the structure.

7. The system of claim 1, wherein said processor is configured with image recognition technology.

8. The system of claim 1, wherein said processor is configured to anchor into the 2-D floor plan a 3-D object tag associated with a 2-D floor plan symbol.

9. The system of claim 1, wherein the interactable 3-D spatial mapping is configured to simulate smoke density.

10. The system of claim 1, wherein the recognized objects are tagged as either interactable or not interactable.

11. The system of claim 10, wherein recognized objects tagged as interactable include at least one of a fire extinguisher and a hose reel.

12. The system of claim 1, wherein the interactable 3-D spatial mapping is displayable only on a mobile communications device or virtual reality headset.

13. A method for generating an indoor spatial mapping, comprising:
   storing a 2-D floor plan in a floor plan database;
   digitally tagging reference points which includes at least one item of emergency equipment in a level of a structure, the reference points including geospatial coordinates of the at least one item;
   anchoring the at least one tagged item of emergency equipment to the 2-D floor plan in an initial position by fixing the coordinates of the at least one item within a geospatial grid; and
   rendering a 3-D floor plan with at least one anchored item of emergency equipment, the anchored emergency equipment being interactable within the 3-D floor plan, the at least one item of emergency equipment being tagged as an interactable 3-D object based on a recognized symbol contained in the 2-D floor plan.

14. The method of claim 13, wherein the rendering of the 3-D floor plan includes delivering the 3-D floor plan in an augmented reality format.

15. The method of claim 13, wherein the rendering of the 3-D floor plan includes delivering the 3-D floor plan in virtual reality format to a virtual reality headset.

16. The method of claim 13, further including digitally altering the 3-D floor plan to incorporate a smoke density level.

17. The method of claim 13, wherein the at least one item of emergency equipment includes a fire extinguisher.

18. The method of claim 13, wherein at least one of the reference points is associated with an entryway, the reference point associated with the entryway being tagged with local coordinate data.

19. The method of claim 13, wherein at least one of the reference points is associated with an entryway, the reference point associated with the entryway being tagged with geographical coordinate data.

20. The method of claim 13, wherein the reference points of the at least one item are tagged differently based on whether the item is moveable.

* * * * *